Patented May 5, 1953

2,637,713

UNITED STATES PATENT OFFICE 2,637,713

MODIFIERS FOR SYNTHETIC RESIN MOLDING COMPOSITIONS AND PROCESS OF PRODUCING THE SAME

Tzeng Jiueq Suen and Arthur M. Schiller, Stamford, Conn., assignors to American Cyanamid Company, New York, N. Y., a corporation of Maine No Drawing. Original application March 21, 1950, Serial No. 151,031. Divided and this application October 13, 1951, Serial No. 251,248

5 Claims. (Cl. 260—30.4)

This invention relates to novel molding compositions comprising urea-formaldehyde resins modified with the reaction products of an epihalohydrin with a monoalkyl ether of a diprimary straight chain aliphatic alcohol, wherein said monoalkyl ether of a diprimary straight chain aliphatic chain alcohol contains between 1–6 alkyleneoxy groups, inclusive, of which each alkyleneoxy group contains 2–6 carbon atoms and wherein said alkyl group is selected from methyl and ethyl alcohol. This invention further relates to the process of preparing the reaction product of an epihalohydrin with a monoalkyl ether of a diprimary straight chain aliphatic alcohol under alkaline conditions. This invention further relates to the use of the above-identified reaction products which have been prepared under alkaline conditions. The modifiers for the urea resins are a group of compounds having the general formula:

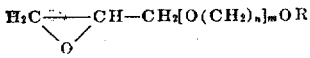

wherein R is a member of the group methyl and ethyl, $n$ is an integer between 2–6, inclusive, and $m$ is an integer between 1–6, inclusive, said compound being amongst those produced by the alkaline reaction of an epihalohydrin with a monoalkyl ether of a diprimary straight chain aliphatic alcohol, wherein the alkyl group is selected from methyl and ethyl and the diprimary straight chain aliphatic alcohol contains between 1–6 alkyleneoxy groups, of which each alkyleneoxy group contains between 2–6 carbon atoms.

One of the objects of the present invention is to use the reaction products defined hereinabove as modifiers in urea-formaldehyde molding powders whereby the shrinkage of articles molded with said powders is reduced to a considerable and marked degree and whereby the field of application of urea-formaldehyde molding compositions is considerably enlarged. A further object of the present invention is to use the reaction products defined hereinabove as flow promoters for resinous compositions such as urea-formaldehyde resins, melamine-formaldehyde resins and the like. A further object of the present invention is to use as modifiers for resins the substituted propanes having the general formula:

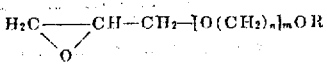

wherein R is a member of the group methyl and ethyl, $n$ is an integer between 2–6, inclusive, and $m$ is an integer between 1–6, inclusive. These and other objects of the present invention will be discussed in greater detail hereinbelow.

Attention is directed to the copending application of one of the co-inventors of the present invention, namely T. J. Suen, whose copending application may be identified by the Serial No. 151,035, filed March 21, 1950, now abandoned. In this copending application, there is described and claimed a process for preparing compounds having the general formula:

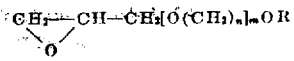

where R is a member of the group methyl and ethyl, $n$ is an integer between 2–6, inclusive, and $m$ is an integer between 1–6, inclusive.

In the preparation of reaction products used to modify the resins to produce the compositions of the present invention, one of the components to the reaction is an epihalohydrin, and it is immaterial which particular epihalohydrin is selected. As a consequence, one may use epichlorohydrin, epibromohydrin, epiiodohydrin, or epifluorohydrin. However, as epichlorohydrin is generally available, it is preferred.

In the preparation of the reaction products used in the present invention, one may use as a coreactant with the epihalohydrin, the monomethyl ethers or the monoethyl ethers of such diprimary straight chain aliphatic alcohols as ethylene glycol, diethylene glycol, triethylene glycol, tetraethylene glycol, pentaethylene glycol, hexaethylene glycol, propanediol-1,3,di(propanediol-1,3) structurally represented as

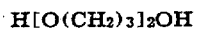

tri(propanediol 1,3) H[O(CH₂)₃]₃OH; hexa(propanediol 1,3, H[O(CH₂)₃]₆OH; butanediol 1,4; tetra(butanediol 1,4), H[O(CH₂)₄]₄OH; hexa(butanediol 1,4), H[O(CH₂)₄]₆OH; pentanediol-1,5; penta(pentanediol 1,5), H[O(CH₂)₅]₅OH; hexa(pentanediol 1,5), H[O(CH₂)₅]₆OH; hexanedial 1,6 di(hexanediol)1,6; H[O(CH₂)₆]₂OH; hexa(hexanediol 1,6), H[O(CH₂)₆]₆OH and the like. It must be remembered, however, that the diprimary straight chain aliphatic alcohols, used to form the monomethyl or monoethyl ethers as defined hereinabove, must contain 1–6 alkyleneoxy groups inclusive, of which each alkyleneoxy group contains 2–6 carbon atoms.

In order that the present invention may be completely understood, the following examples are set forth for the purpose of illustration only and are not to be interpreted as limitations on the case except as indicated by the appended claims. All parts are parts by weight.

EXAMPLE 1

277.5 parts of epichlorohydrin (3 mols) and 402.6 parts of the monoethyl ether of diethylene glycol (3 mols) are introduced into a suitable reaction chamber and mixed together thoroughly whereupon 240 parts of a 50% aqueous solution of sodium hydroxide (3 mols) is introduced slowly over a period of about ½ hour with constant stirring. The reaction temperature is maintained below 55° C. with the aid of external cooling. After all the sodium hydroxide has been added, the temperature is allowed to rise to 80–90° C. in about 5 minutes and is maintained at this approximate range for about 10 minutes. The reaction product is then cooled to room temperature and the salt formed, in the course of the reaction, is filtered off with the aid of 500 parts of dioxane. The filtrate is vacuum concentrated under a pressure of 4.5–5.5 centimeters of mercury until the temperature reaches 111° C. During the concentration, there is still a small amount of salt precipitated out. The salt is again filtered off and the finished product is a clear liquid, reddish in color, and soluble in water.

EXAMPLE 2

1073 parts of diethylene glycol monoethyl ether (8 mols) and 740 parts of epichlorohydrin (8 mols) are introduced into a suitable reaction chamber and thoroughly mixed together whereupon 672 parts of a 50% aqueous solution of sodium hydroxide (8.4 mols) is introduced slowly with constant stirring over a period of 45 minutes. The reaction temperature is maintained at about 50–60° C. with the aid of external cooling. After all the sodium hydroxide has been added, the reaction mixture is permitted to warm up to 70–75° C. and maintained at that temperature for an additional half hour. The mixture is then cooled to room temperature and neutralized with concentrated hydrochloric acid to a pH of 7. The product is filtered to remove the salt formed and the filtrate is vacuum concentrated under an absolute pressure of about 50 mm. of mercury until the temperature reaches 105° C. The residue may again be filtered to remove any additional salt.

In the filtering step in the examples set forth both hereinabove and hereinbelow, use is made of a particular inert solvent, namely dioxane. It is actually not necessary to use a solvent, but it is preferred to use one, in order to lower the viscosity and for ease in accomplishing the process. If one elects to use a solvent, one should select an inert solvent such as an ether of a monohydric alcohol or a diether of a dihydric alcohol or a monoaliphatic ester of a monohydric alcohol or a polyester of an aliphatic monocarboxylic acid and a polyhydric alcohol such as diethyl ether, dipropyl ether, dibutyl ether, methyl propyl ether, dimethyl ether of ethylene glycol, diethyl ether of ethylene glycol, dimethyl ether of diethylene glycol, ethyl acetate, ethylene glycol, diacetate, methoxyethylene glycol acetate and the like.

EXAMPLE 3

185 parts of epichlorohydrin (2 mols) and 356 parts of triethylene glycol monoethyl ether (2 mols) are mixed together in a suitable reaction chamber and 200 parts of a 40% aqueous solution of hydroxide (2 mols) is slowly added in the course of about 15 minutes, during which time the temperature is maintained at 60° C. or below. The reaction mixture is then allowed to warm up and is maintained at 80–85° C. for a ½ hour period. After the reaction mixture has been cooled, 200 parts of dioxane is added and the mixture further cooled to about 10° C. and is filtered to remove the salt formed in the course of the reaction. The filtrate is vacuum concentrated under an absolute pressure of about 50 mm. of mercury to a temperature of 115° C. The cooled residue is again filtered.

EXAMPLE 4

277 parts of epichlorohydrin (3 mols) and 270 parts of ethylene glycol monoethyl ether (3 mols) are mixed together in a suitable reaction chamber and 300 parts of a 40% aqueous solution of sodium hydroxide is slowly added over a period of about ½ hour while the temperature is maintained at 50–55° C. The reaction mixture is then allowed to warm up and is maintained at 80–85° C. for a 15 minute period, whereupon the mixture is cooled to room temperature. The mixture is then filtered to remove the salt formed in the course of the reaction and the filtrate is vacuum concentrated under an absolute pressure of about 50 mm. of mercury to a temperature of about 100° C. The cooled residue is again filtered.

EXAMPLE 5

277 parts of epichlorohydrin (3 mols) and 360 parts of diethylene glycol monoethyl ether (3 mols) are mixed together in a suitable reaction chamber and 300 parts of a 40% aqueous solution of sodium hydroxide (3 mols) is added slowly over a period of about ½ hour while the temperature is maintained at about 55° C. or below. The reaction mixture is then allowed to warm up and is maintained at about 80–85° C. for approximately 20 minutes. The reaction product is then cooled to about room temperature and filtered to remove the salt formed in the course of the reaction and the filtrate is vacuum concentrated under an absolute pressure of about 50 mm. of mercury to a temperature of about 115° C. The concentrated product is cooled and again filtered.

EXAMPLE 6

1,2-epoxy, 3-ethoxyethoxy-propane 463 parts of epichlorohydrin (5 mols) and 451 parts of ethylene glycol monoethyl ether (5 mols) are mixed together in a suitable reaction chamber equipped with thermometer, stirrer, reflux condenser, and dropping funnel. 675 parts of a solution containing 200 parts of sodium hydroxide (5 mols) in water is slowly added in about a 15 minute period. The temperature of the reaction mixture is maintained at about 28–31° C. The reaction is permitted to proceed at 28–31° C. for about 7½ hours. At this point, titration of a sample of reaction mixture indicates that about 60% of the cautic has been reacted. When stirring is stopped, the reaction mixture separates into an organic layer, an aqueous layer, and a salt layer. The organic layer is removed and fractionated under vacuum with a suitable fractionating column. After removing the unreacted reagents and stirring, the 1,2-epoxy, 3-ethoxyethoxy-propane is collected at 60–65° C. under an absolute pressure of 4 mm. of mercury. The yield amounts to about 260 parts.

It has been stated hereinabove that the condensation products of the present invention may be utilized as modifiers for synthetic resinous molding compositions such as urea-formaldehyde molding powders, particularly for the purpose of reducing the amount of shrinkage of the articles molded with these molding powders. The following example is set forth to illustrate how this may be accomplished.

EXAMPLE 7

A urea-formaldehyde resin syrup is prepared in the conventional way with a mol ratio of formaldehyde to urea of 1.33:1 in which the reaction between the formaldehyde and urea is carried out at a pH of about 7.9 and at a temperature of about 30° C. for 1 hour. This reaction is continued at 50° C. until the free formaldehyde content drops to about 4.5%. The diethylene glycol monoethyl ether-epichlorohydrin condensation product prepared as described in Example 1 hereinabove may be added as a modifier to a resin syrup such as the one prepared hereinabove and the pH of the solution is adjusted to approximately 6.6. The modified resin syrup is then mixed with alpha cellulose pulp and the mixture is dried and then ground with a suitable curing agent and lubricant to a fine powder. The proportion of resin solid:modifier: alpha cellulose pulp is 60:5:35. In the evaluation of the molding powder prepared as described above, a molded article shows its mold shrinkage to be 4.5 mils per inch and its after shrinkage 1.2 mils per inch. An unmodified molding powder shows a mold shrinkage averaging 4-6 mils per inch and after shrinkage averaging 4-7 mils per inch.

The determination of the shrinkage of a molded article is accomplished in the following manner. The shrinkage of the molded article is evaluated by means of a test piece in the form of a circular disk ⅛ inch thick and 4 inches in diameter and is measured in terms of "mold shrinkage" and "after shrinkage." If the diameter of the cold mold cavity is denoted as A; the diameter of the molded disk after being conditioned at 25° C. and at a relative humidity of 50% for 48 hours is denoted as B; and the diameter of the disk after further conditioning for 48 hours at 220° F. and thereafter being cooled to 25° C. at 50% relative humidity is denoted as C, the following equations can be set up in which the shrinkages are measured in terms of mils/inch $$\text{Mold shrinkage} = \frac{A-B}{A} \times 1000$$

$$\text{After shrinkage} = \frac{B-C}{A} \times 1000$$

$$\text{Total shrinkage} = \frac{A-C}{A} \times 1000$$

EXAMPLE 8

A urea-formaldehyde molding powder modified with the product produced according to the process of Example 2 is prepared in a manner comparable to that set forth hereinabove and identified as Example 7, showed upon evaluation, a mold shrinkage of 4.4 mils per inch and an after shrinkage of 1.4 mils per inch.

EXAMPLE 9

A urea-formaldehyde molding powder modified with the condensation product prepared according to the process of Example 2 is prepared in the same manner as that set forth in Example 7 except that the resin solids:modifier:pulp ratio is 55:10:35. Upon evaluation the mold shrinkage is 4.4 mils per inch and the after shrinkage 0.9 mils per inch.

EXAMPLE 10

A urea-formaldehyde molding powder modified with the product prepared according to the process of Example 3, is prepared according to the procedure set forth hereinabove according to Example 7. Upon evaluation, its mold shrinkage is 4.5 mils per inch and its after shrinkage 1.5 mils per inch.

EXAMPLE 11

A urea-formaldehyde molding powder, modified with the product, prepared according to Example 4, is prepared according to the procedure hereinabove under Example 7. Upon evalution, the mold shrinkage is 4-5 mils per inch and the after shrinkage is 1.3 mils per inch.

EXAMPLE 12

A urea-formaldehyde molding powder modified with the product prepared according to Example 5 is formulated according to the procedure as set forth hereinabove in Example 7. Upon evaluation, the mold shrinkage is 4.5 mils per inch and the after shrinkage 1.4 mils per inch.

In addition to compounds having the general formula as defined hereinabove,

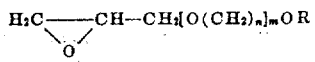

present in the condensation products of the present invention, there are also present compounds having the general formula:

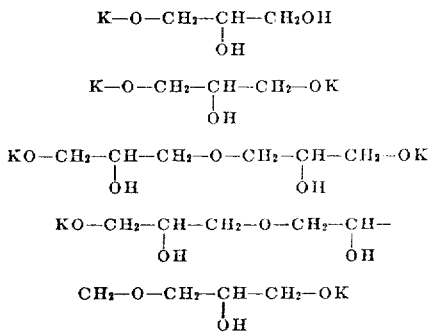

and the like, where $K=R-[O(CH_2)_n]_m$ and $n$ is an integer between 2-6 inclusive, and $m$ is an integer between 1-6, inclusive, R is a member of the group methyl and ethyl.

The yield of the 1,2-epoxy-3-alkoxyalkyleneoxy propane is not particularly substantial in the practice of the process of the present invention. In the practice of the process of the copending application of T. J. Suen, identified hereinabove, the yield is substantially improved. The condensation products of the present invention have, however, a greater effect on the reduction of shrinkage of molded articles than have the substituted propanes used individually and having the general formula:

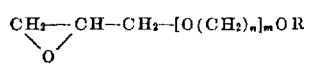

wherein R is a member of the group methyl and ethyl, $n$ is an integer between 2-6, inclusive, and $m$ is an integer between 1-6, inclusive. Obviously, these modifiers can be used with urea-formaldehyde molding powders having mol ratios different from the 1:1.33 set forth hereinabove such as 1:1 to 1:4. These modifiers can be used additionally to modify other resinous molding compositions such as melamine-formaldehyde resins, guanadine resins, phenolic resins, aniline resins and the like.

Included in the group of specific compounds which the applicants have discovered are the following: 1,2-epoxy, 3-methoxyethoxy-propane; 1,2-epoxy, 3-ethoxyethoxy-propane; 1,2-epoxy, 3 - methoxyethoxyethoxy-propane; 1,2 - epoxy, 3 - ethoxyethoxyethoxy - propane; 1,2 - epoxy, 3 - methoxyethoxyethoxyethoxyethoxyethoxy-ethoxy-propane; 1,2-epoxy, 3-ethoxyethoxyethoxyethoxyethoxyethoxy - propane; 1,2-epoxy, 3-methoxypropoxy-propane; 1,2-epoxy, 3 - ethoxypropoxy - propane; 1,2 - epoxy, 3 - methoxypropoxypropoxypropoxypropoxypropoxy-propoxy - propane; 1,2-epoxy, 3-ethoxypropoxy-propoxypropoxypropoxypropoxypropoxy - propane; 1,2-epoxy, 3-methoxybutoxy-propane; 1,2-epoxy, 3-ethoxybutyoxy - propane; 1,2-epoxy, 3 - methoxybutoxybutoxybutoxybutoxybutoxy-butoxy - propane; 1,2 - epoxy, 3 - ethoxybutoxybutoxybutoxybutoxybutoxybutoxy-propane; 1,2-epoxy, 3-methoxypentoxy-propane; 1,2-epoxy, 3 - ethoxypentoxy - propane; 1,3 - epoxy, 3 - methoxypentoxypentoxypentoxypentoxypentoxy-pentoxy-propane; 1,2-epoxy, 3-ethoxypentoxypentoxypentoxypentoxypentoxypentoxy - propane; 1,2-epoxy, 3-methoxyhexoxy-propane; 1,2-epoxy, 3 - ethoxy - hexoxy - propane; 1,2 - epoxy, 3 - methoxyhexoxyhexoxyhexoxyhexoxyhexoxy-hexoxy-propane; 1,2-epoxy, 3-ethoxyhexoxyhexoxyhexoxyhexoxyhexoxyhexoxy-propane.

This case is a division of application, Serial No. 151,031, filed March 21, 1950, which relates to the substituted propanes defined hereinabove and the process of preparing the same.

We claim:

1. A molding composition comprising a urea-formaldehyde resin and the heat reaction product of an epihalohydrin with a compound having the general formula: H[O(CH₂)ₙ]ₘOR, wherein R is a member selected from the group consisting of methyl and ethyl, n is an integer between 2–6, inclusive, and m is an integer between 1–6 inclusive, wherein said reaction product is produced under alkaline conditions.

2. A molding composition comprising a urea-formaldehyde resin and a compound having the general formula:

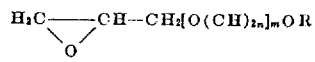

wherein R is a member selected from the group consisting of methyl and ethyl, n is an integer between 2–6, inclusive, and m is an integer between 1–6, inclusive.

3. A molding composition comprising a urea-formaldehyde resin and 1,2-epoxy, 3-methoxyethoxy-propane.

4. A molding composition comprising a urea-formaldehyde resin and 1,2-epoxy, 3-ethoxyethoxy-propane.

5. A molding composition comprising a urea-formaldehyde resin and 1,2-epoxy, 3-ethoxyethoxyethoxy-propane.

TZENG JIUEQ SUEN.
ARTHUR M. SCHILLER.

No references cited.